US011972673B2

(12) United States Patent
Sahu et al.

(10) Patent No.: US 11,972,673 B2
(45) Date of Patent: Apr. 30, 2024

(54) SYSTEM FOR ASSISTING A PATIENT TO RAISE AN ALARM

(71) Applicant: L&T TECHNOLOGY SERVICES LIMITED, Chennai (IN)

(72) Inventors: Jagdish Prasad Sahu, Mysore (IN); Keyur Bhalodiya, Rajkot (IN); Ashish Kumar, Godda (IN); Rishabh Ranjan, Patna (IN)

(73) Assignee: L&T TECHNOLOGY SERVICES LIMITED, Tamil Nadu (IN)

( * ) Notice: Subject to any disclaimer, the term of this patent is extended or adjusted under 35 U.S.C. 154(b) by 0 days.

(21) Appl. No.: 17/848,849

(22) Filed: Jun. 24, 2022

(65) Prior Publication Data

US 2023/0111719 A1 Apr. 13, 2023

(51) Int. Cl.
*G08B 21/18* (2006.01)
*G08B 21/02* (2006.01)

(52) U.S. Cl.
CPC ........... *G08B 21/182* (2013.01); *G08B 21/02* (2013.01)

(58) Field of Classification Search
CPC .............................. G08B 21/182; G08B 21/02
USPC ........................................................ 340/573.1
See application file for complete search history.

(56) References Cited

U.S. PATENT DOCUMENTS

| | | | | |
|---|---|---|---|---|
| 10,043,368 | B1 * | 8/2018 | Fonzi, III | G08B 21/0446 |
| 2004/0131498 | A1 * | 7/2004 | Kuutti | G08B 21/182 422/83 |
| 2012/0146787 | A1 * | 6/2012 | Bose | G08B 21/02 340/539.13 |
| 2014/0191863 | A1 * | 7/2014 | Ten Kate | A61B 5/7282 340/539.12 |
| 2016/0059048 | A1 * | 3/2016 | Kanakala | A62B 7/02 128/205.22 |
| 2016/0199008 | A1 * | 7/2016 | Lyon | G16Z 99/00 340/870.09 |
| 2016/0220153 | A1 * | 8/2016 | Annegarn | A61B 5/7275 |
| 2016/0314674 | A1 * | 10/2016 | He | G06F 1/163 |
| 2018/0108238 | A1 * | 4/2018 | Chen | A42B 3/046 |
| 2020/0288808 | A1 * | 9/2020 | Segal | A42B 3/069 |
| 2021/0287318 | A1 * | 9/2021 | Sterpin | H04W 4/33 |
| 2021/0315303 | A1 * | 10/2021 | Daddi | A42B 3/08 |
| 2023/0316888 | A1 * | 10/2023 | Thompson | G08B 25/10 340/573.1 |

* cited by examiner

*Primary Examiner* — Zhen Y Wu

(57) ABSTRACT

A system (102) for assisting a patient to raise an alarm is disclosed. The system (102) may include a sensor (106) configured to be positioned at a head region of the patient and to detect movement of head of the patient. The system (102) may further include a patient assisting device (104) coupled to the sensor (106). The patient assisting device (104) may be configured to receive, from the sensor (106), a signal corresponding to the movement of the head of the patient, determine a state of alarm value from the signal, and generate an alarm based on the state of alarm value.

11 Claims, 6 Drawing Sheets

300B

| | Sensitivity Level 318 | | |
|---|---|---|---|
| Alarm Priority 320 | 1 (More Sensitive / Less Effort) 322 | 2 (Medium Sensitive / Medium Effort) 324 | 3 (Less Sensitive / More Effort) 326 |
| Low | 2<n≤3 | 3<n≤5 | 5<n≤7 |
| Medium | 3<n≤5 | 5<n≤7 | 7<n≤9 |
| High | n>5 | n>7 | n>9 |

FIG. 3B

SYSTEM FOR ASSISTING A PATIENT TO RAISE AN ALARM

TECHNICAL FIELD

This disclosure relates generally to the health care, and in particular to a system for assisting a patient to raise an alarm based on head movement detection of the patient.

BACKGROUND OF THE INVENTION

Patients confined to ventilators, beds, or wheelchairs because of illness, disability, or age may require frequent assistance from support staff or tending family members. However, at times, the patient is not able to raise an alarm to seek help as he/she may be unable to perform gestures. For example, a ventilator bound patient may not be able to speak, and as such they may not be able to call out for help at the time of distress. To aid in the care of these patients, some medical safety devices are available that allow such patient to sound an alarm, for example, by pressing a button. The noise produced by these safety devices alerts nurses or other medical personnel that the patient requires assistance.

However, certain patients may not be able to even use such safety devices, especially, when the patient's hands are paralyzed or the medical safety device is not available in proximity to the patient, or when movement of the limbs of the patient is confined (i.e. tied to the bed). As such, the patient is unable to call for assistance at the time of distress. For such cases, there is a need for a system that automatically detects a condition of the patient requiring assistance and raises an alarm to draw attention.

SUMMARY OF THE INVENTION

In an embodiment, a system for assisting a patient to raise an alarm is disclosed. The system may include a sensor configured to be positioned at a head region of the patient and configured to detect a movement of the head of the patient. The system may further include a processor coupled to the sensor and a memory communicatively coupled to the processor. The memory stores a plurality of instructions, which upon execution by the processor, may cause the processor to receive, from the sensor, a signal corresponding to the movement of the head of the patient. The plurality of instructions, upon execution by the processor, may further cause the processor to determine a state of alarm value from the signal, and generate an alarm based on the state of alarm value.

In another embodiment, a respiratory mask is disclosed. The respiratory mask may include a sensor configured to be positioned at a head region of the patient. The sensor may be configured to detect movement of the head of the patient. The respiratory mask may further include a transceiver coupled to the sensor. The transceiver may be configured to transmit, to an alarm generating device, a signal corresponding to the movement of the head of the patient detected by the sensor. The alarm generating device may be configured to receive, from the sensor, the signal corresponding to the movement of the head of the patient, determine a state of alarm value from the signal, and generate an alarm based on the state of alarm value.

In another embodiment, a method for assisting a patient to raise an alarm is disclosed. The method may include, receiving from a sensor, a signal corresponding to a movement of the head of the patient. Further, the sensor may be configured to be positioned at a head region of a patient and may further be configured to detect movement of the head of the patient. The method may further include to determine, by a patient assisting device, a state of alarm value using the signal. The method may further generate, by the patient assisting device, an alarm based on the state of alarm value.

BRIEF DESCRIPTION OF THE DRAWINGS

The accompanying drawings, which are incorporated in and constitute a part of this disclosure, illustrate exemplary embodiments and, together with the description, serve to explain the disclosed principles.

FIG. 3B illustrates a Table showing different priorities of alarms that are classified based on their sensitivity level, in accordance with an embodiment of the present disclosure.

DETAILED DESCRIPTION OF THE DRAWINGS

Exemplary embodiments are described with reference to the accompanying drawings. Wherever convenient, the same reference numbers are used throughout the drawings to refer to the same or like parts. While examples and features of disclosed principles are described herein, modifications, adaptations, and other implementations are possible without departing from the spirit and scope of the disclosed embodiments. It is intended that the following detailed description be considered as exemplary only, with the true scope and spirit being indicated by the following claims. Additional illustrative embodiments are listed below.

Figure 1:
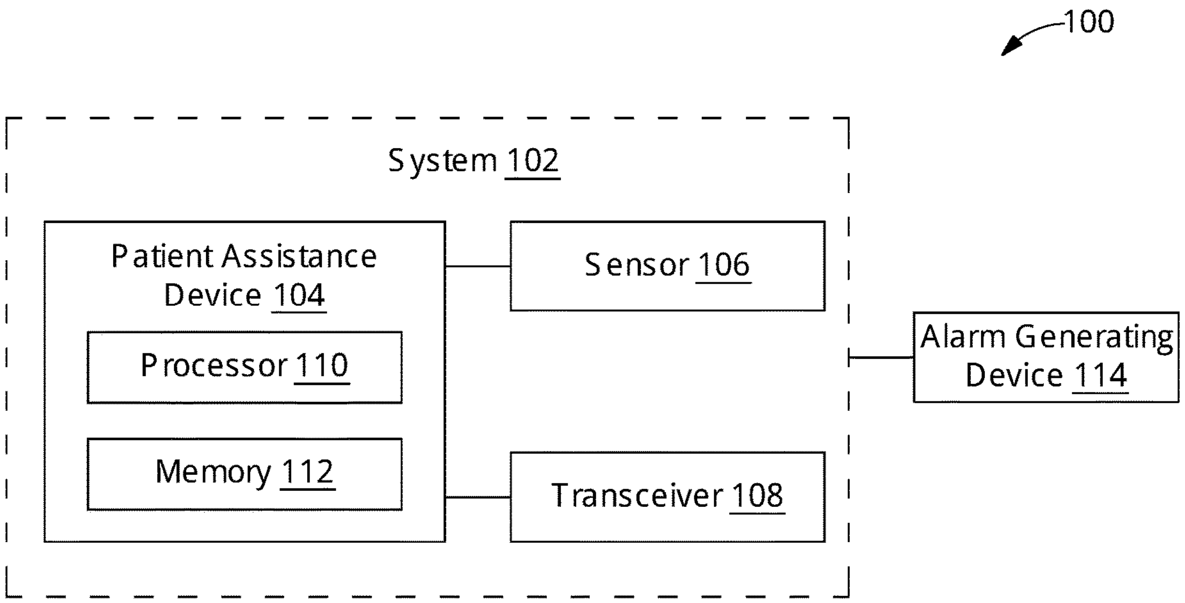
FIG. 1 illustrates a block diagram of an environment of a system for assisting a patient to raise an alarm, in accordance with an embodiment of the present disclosure.

Referring to FIG. 1, a block diagram of an environment 100 of a system for assisting a patient to raise an alarm is illustrated, in accordance with an embodiment. As shown in the FIG. 1, the environment 100 includes a system 102 for assisting a patient to raise an alarm and an alarm generating device 114. The system 102 may include a sensor 106 and patient assistance device 104 coupled to the sensor 106. The sensor 106 may be configured to be positioned at a head region of the patient. For example, the sensor 106 may be provided on a ventilation mask (also called respiratory mask) worn by the patient. The sensor 106 may be configured to detect movement of the head of the patient. As such, the sensor 106 may include at least one of a three-axis accelerometer and a gyroscope sensor.

The patient assistance device 104 may include a processor 110 that may be coupled to the sensor 106. The patient assistance device 104 may further include a memory 112 communicatively coupled to the processor 110. The memory 112 stores a plurality of instructions, which upon execution by the processor 110, cause the processor 110 to receive, from the sensor 106, a signal corresponding to the movement of the head of the patient, determine a state of alarm value from the signal; and generate an alarm based on the state of alarm value.

The processor 110 may include suitable logic, circuitry, interfaces, and/or code. The processor 110 may be implemented based on a number of processor technologies, which may be known to one ordinarily skilled in the art. Examples of implementations of the processor 110 may be a Graphics Processing Unit (GPU), a Reduced Instruction Set Computing (RISC) processor, an Application-Specific Integrated Circuit (ASIC) processor, a Complex Instruction Set Computing (CISC) processor, a microcontroller, Artificial Intelligence (AI) accelerator chips, a co-processor, a central processing unit (CPU), and/or a combination thereof.

The memory 112 may include suitable logic, circuitry, and/or interfaces that may be configured to store instructions executable by the processor 110. Additionally, the memory 112 may be configured to store program code of one or more machine learning models and/or the software application that may incorporate the program code of the one or more machine learning models. The memory 112 may be configured to store any received data or generated data associated with the patient assistance device 104. Examples of implementation of the memory 112 may include, but are not limited to, Random Access Memory (RAM), Read Only Memory (ROM), Electrically Erasable Programmable Read-Only Memory (EEPROM), Hard Disk Drive (HDD), a Solid-State Drive (SSD), a CPU cache, and/or a Secure Digital (SD) card.

The patient assistance device 104 may further include a transceiver 108. The transceiver 108 may be configured to transmit the state of alarm value to an alarm generating device 114. For example, the alarm generating device 114 may be a ventilator capable of generating a perceptible alarm. Alternately, the generating device 114 may be a separate device capable of generating a perceptible alarm. In some embodiments, the alarm generated by the generating device 114 may include an audio alarm, e.g., a siren.

The transceiver 108 may be configured to transmit the state of alarm value to the alarm generating device 114 over a communication network. The communication network may include, but are not limited to, the Internet, a cloud network, a Wireless Fidelity (Wi-Fi) network, a Personal Area Network (PAN), a Local Area Network (LAN), or a Metropolitan Area Network (MAN). Various devices in the environment may be configured to connect to the communication network, in accordance with various wired and wireless communication protocols. Examples of such wired and wireless communication protocols may include, but are not limited to, a Transmission Control Protocol and Internet Protocol (TCP/IP), User Datagram Protocol (UDP), Hypertext Transfer Protocol (HTTP), File Transfer Protocol (FTP), Zig Bee, EDGE, IEEE 802.11, light fidelity (Li-Fi), 802.16, IEEE 802.11s, IEEE 802.11g, multi-hop communication, wireless access point (AP), device to device communication, cellular communication protocols, and Bluetooth (BT) communication protocols.

In some embodiments, the processor 110 may be further configured to detect, based on the signal, a number of movements, a speed of movement, and a duration of movement. The processor 110 may further determine the state of alarm value based on at least one of the number of movements, the speed of movement, and the duration of movement. It should be noted that the movement of the head of the patient may include at least one of a head nod or a head shake. The head nod may correspond to a tilting of the head in alternating up and down arcs along a sagittal plane. The head shake may correspond to a repeated turning of the head leftwards and rightwards along a transverse plane.

In some embodiments, the processor 110 may be further configured to categorize the state of alarm values into one of a plurality of categories state of alarm values. The plurality of categories state of alarm values may be based on an alarm priority 320 which further may include a low priority state of alarm value, a medium priority state of alarm value, or a high priority state of alarm value. The processor 110 may further generate the alarm based on the categorization.

In some embodiments, categorizing the state of alarm value may include receiving a sensitivity setting (which may further include a sensitivity level 318) and comparing the determined state of alarm value with a plurality of threshold values associated with the sensitivity setting. Each of the plurality of threshold values may correspond to a category of the plurality of categories of state of alarm values. As such, the determined state of alarm value may be categorized into one of the plurality of categories of state of alarm values based on the comparison.

Figure 2:
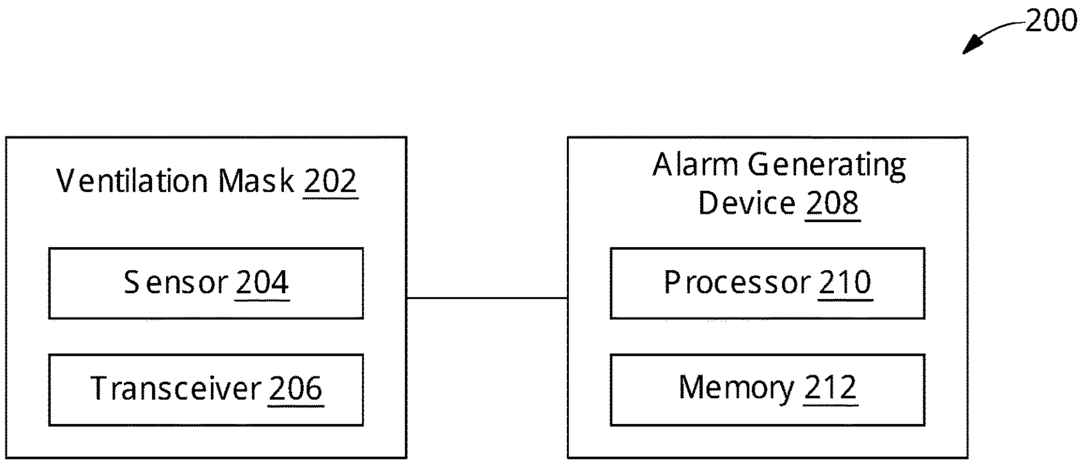
FIG. 2 illustrates a block diagram of an environment of a sub-system of the system of FIG. 1 for assisting a patient to raise an alarm by an alarm generating device, in accordance with another embodiment of the present disclosure.

Referring now to FIG. 2, a block diagram of an environment 200 of a sub-system for assisting a patient to raise an alarm by an alarm generating device is illustrated, in accordance with another embodiment. As shown in the FIG. 2, the environment 200 includes a ventilation mask 202 and an alarm generating device 208. The ventilation mask 202 may include a sensor 204 and a transceiver 206. By way of providing the sensor at the ventilation mask 202, the sensor 204 is positioned at a head region of the patient. The sensor 204 is configured to detect movement of the head of the patient. The sensor 204 may include at least one of a three-axis accelerometer and a gyroscope sensor.

The transceiver 206 may be coupled to the sensor 204. The transceiver 206 may be configured to transmit, to an alarm generating device 208, a signal corresponding to the movement of the head of the patient detected by the sensor 204.

The alarm generating device 208 may include a processor 210 and a memory 112 communicatively coupled to the processor 210. The memory 212 stores a plurality of instructions, which upon execution by the processor 210, cause the processor 210 to receive, from the sensor 204, the signal corresponding to the movement of the head of the patient, determine a state of alarm value from the signal, and generate an alarm based on the state of alarm value.

Figure 3A:
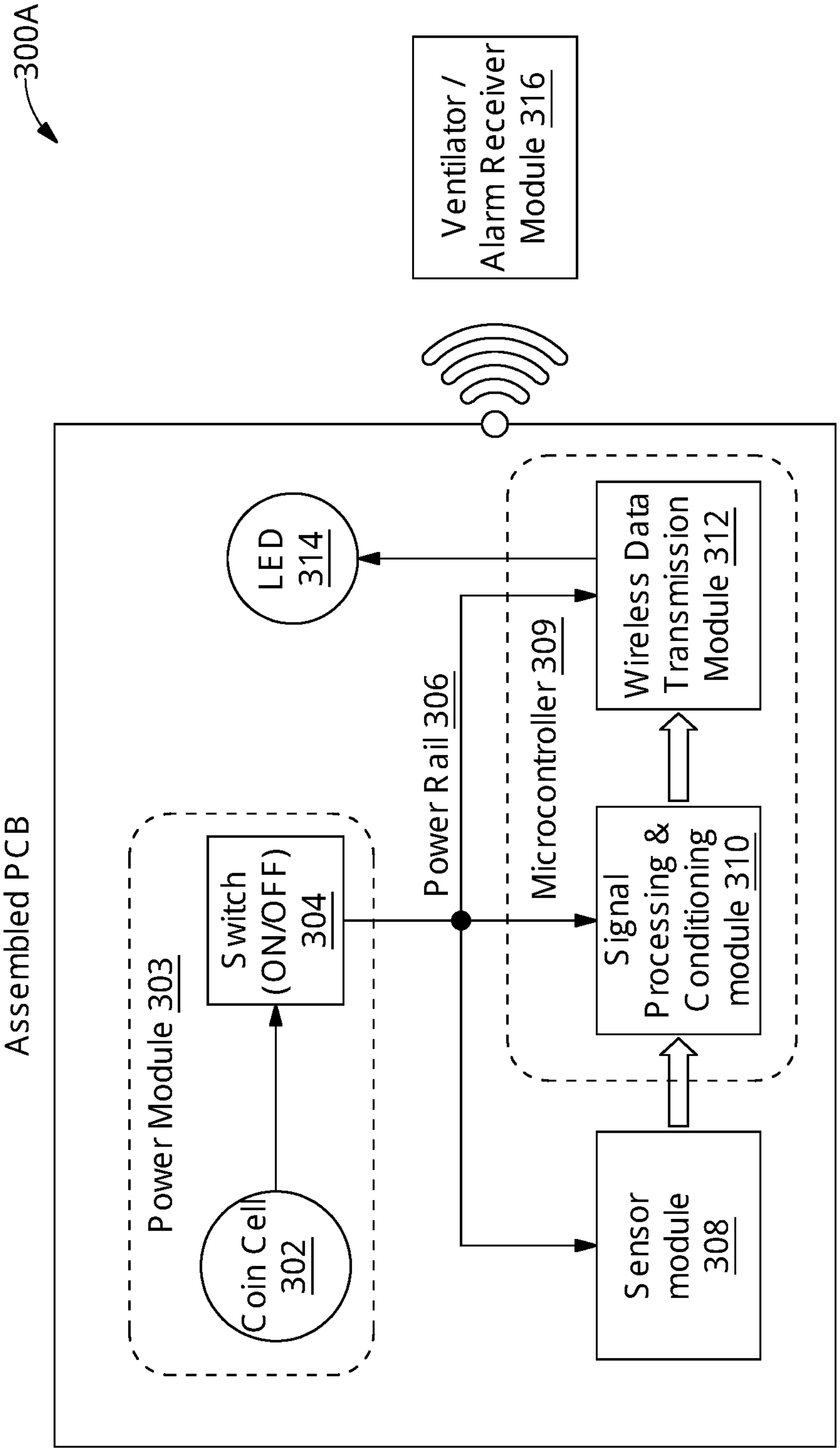
FIG. 3A illustrates a block diagram of an assembled PCB of system for assisting patient to raise an alarm, in accordance with an embodiment of the present disclosure.

Referring now to FIG. 3A, a block diagram of a system 300A for assisting a patient to raise an alarm is illustrated, in accordance with an embodiment of the present disclosure. As shown in FIG. 3A, the system 300A may include a sensor module 308 and a microcontroller 309. The microcontroller 309 may further include a signal processing and conditioning module 310 and a wireless data transmission module 312. The system 300A may further include a ventilator/alarm receiver module 316. Further, the system 300A may include a power rail 306 and a light emitting diode (LED) 314. Furthermore, the system 300A may include a power module 303, which may further include a coin cell 302 and a switch 304 for powering the system 300A.

A movement of the patient head indicative of calling a nurse or for any help may be detected by the sensor module 308. As mentioned earlier, the sensor module 308 may include a three-axis accelerometer and a gyroscope sensor. In some embodiments, a sensor may be mounted on a chip incorporated on a respiratory mask worn by the patient for detecting the head movement. The head movement may be a head shake or a head nod by the patient. A head nod may be a gesture in which the head is tilted in alternating up and down arcs along the sagittal plane. A head shake may be a gesture in which the head is turned left and right along the transverse plane repeatedly in quick succession. The sensor module 308 may detect head shake or head nod or both at the same time. Upon receiving data from the sensor module 308, the data may be processed by the signal processing and conditioning module 310 of the microcontroller 309. The signal processing and conditioning module 310 may detect at least one parameter associated with the movement of the head of the patient, based on the signal. The at least one parameter may include a number of head movements, a speed of head movement, and a duration of head movement based on the signal received by the sensor module 308.

The processed data may be transmitted by the wireless data transmission module 312 to send an alarm signal to the ventilator/alarm receiving module 316. The wireless data transmission module 312 may be coupled to the sensor for transmitting signal corresponding to the movement detected by the sensor module 308. The wireless transmission may be through Wi-Fi or Bluetooth.

The system 300A may receive power from the power module 303. The power module 303 may include the coin cell 302 and the switch 304. The system may further include the LED 314. The coin cell 302 may be a removable battery that may be used to supply power to the system and to the switch 304 attached through the power rail 306. The switch 304 may be used to power ON and OFF the system. The switch 304 may be set to ON while the system is in use and set to OFF when the system is not in use. During operation, the LED 314 may illuminate to indicate that the system is in use. The LED 314 may also be used to indicate successful data transmission from the sensor to receiver end.

In an embodiment, the alarms or the state of alarm values may be categorized into different categories, for example, based on based on alarm priority, such as a low alarm priority category, a medium alarm priority category, and a high alarm priority category. The state of alarm priority values may be further categorized based on sensitivity levels. The above categorization may be performed based on sensitivity settings or thresholds. This is explained in detail in conjunction with FIG. 3B.

Referring now to FIG. 3B, a Table 300B depicting categorization of the state of alarm values is illustrated, in accordance with some embodiments. The Table 300B includes categories associated with alarm priorities 320 and sensitivity levels 318. For example, as shown in FIG. 3B, the alarm priorities 320 may include a low priority alarm category, a medium priority alarm category, and a high priority alarm category. Further, for example, the sensitivity levels 318 may include a first sensitivity level 322, a second sensitivity level 324, and a third sensitivity level 326.

By way of an example, the sensitivity levels 318 may be set by a user, for example, by a nursing attendant, based on the condition of the patient. The sensitivity levels 318 may include the first sensitivity level 322, the second sensitivity level 324, and the third sensitivity level 326. The first sensitivity level 322 indicates that the patient may need to exert less effort to activate the alarm. In other words, a low-level movement of the head is sufficient to activate the alarm. As such, the first sensitivity level 322 may be suitable for patients who are more serious conditions. The second sensitivity level 324 suggests that the patient's medium effort may set off the alarm, i.e. at least a medium-level movement of the head is required to activate the alarm. The third sensitivity level 326 may be appropriate for patients who are fully conscious and capable of shaking their heads at a higher frequency or greater movement. When the third sensitivity level is set, the patient must exert more effort or carry out greater movement of the head to activate the alarm. Therefore, the third sensitivity level 326 is suitable for patients with less serious conditions. In this context, effort may refer to the number of head movements.

In some embodiments, a knob may be provided that allows the user (i.e. a nursing personnel) to set the sensitivity levels 318 at the first sensitivity level 322, the second sensitivity level 324, or the third sensitivity level 326. Further, within each of the multiple sensitivity levels 318, the low priority alarm category, a medium priority alarm category, and the high priority alarm category may be defined.

For example, a low priority alarm may be activated at a low-level movement of the head of the patient in a predetermined time frame, i.e. a movement of the head with less effort of the patient. The medium priority alarm may be activated at a medium-level movement of the head of the patient in a predetermined time frame, i.e. a movement of the head with relatively higher effort of the patient. The high priority alarm may be activated at a high-level movement of the head of the patient in a predetermined time frame, i.e. a movement of the head with highest effort of the patient.

In some embodiments, the alarm priority categories may trigger different associated alarm types. For example, the alarm types may differ on the basis of a loudness of sound. As such, the alarm type associated with the high priority alarm category may be the loudest, as compared to alarm types associated with the medium priority alarm category and the low priority alarm category. Further, the alarm types may differ on the basis of a type of sound, or a type of stimuli.

As mentioned above, sensitivity settings or thresholds may be defined, based on which the different categories of state of alarm values may be alarm categorized. For example, if for the first sensitivity level 322, the patient is doing 3 head movements ($2<n\leq 3$), then a low priority alarm will be triggered. In case patient is doing 4 or 5 ($3<n\leq 5$) head movements, then a medium priority alarm will be triggered, and if the patient is doing 6 or more ($n>5$) head movements, then a high priority alarm will be triggered. Further, for example, if for the second sensitivity level 324, the patient is doing 4 or 5 head movements ($3<n\leq 5$), then a low priority alarm will be triggered. In case patient is doing 6 or 7 ($5<n\leq 7$) head movements, then a medium priority alarm will be triggered, and if the patient is doing 8 or more ($n>7$) head movements, then a high priority alarm will be triggered. For example, if for the third sensitivity level 326, the patient is doing 6 or 7 head movements ($5<n\leq 7$), then a low priority alarm will be triggered. In case patient is doing 8 or 9 ($7<n\leq 9$) head movements, then a medium priority alarm will be triggered, and if the patient is doing 10 or more ($n>9$) head movements, then a high priority alarm will be triggered. To avoid false alarms, a minimum threshold limit is set for all sensitivity levels 318, and it may vary for each level.

Figure 4:
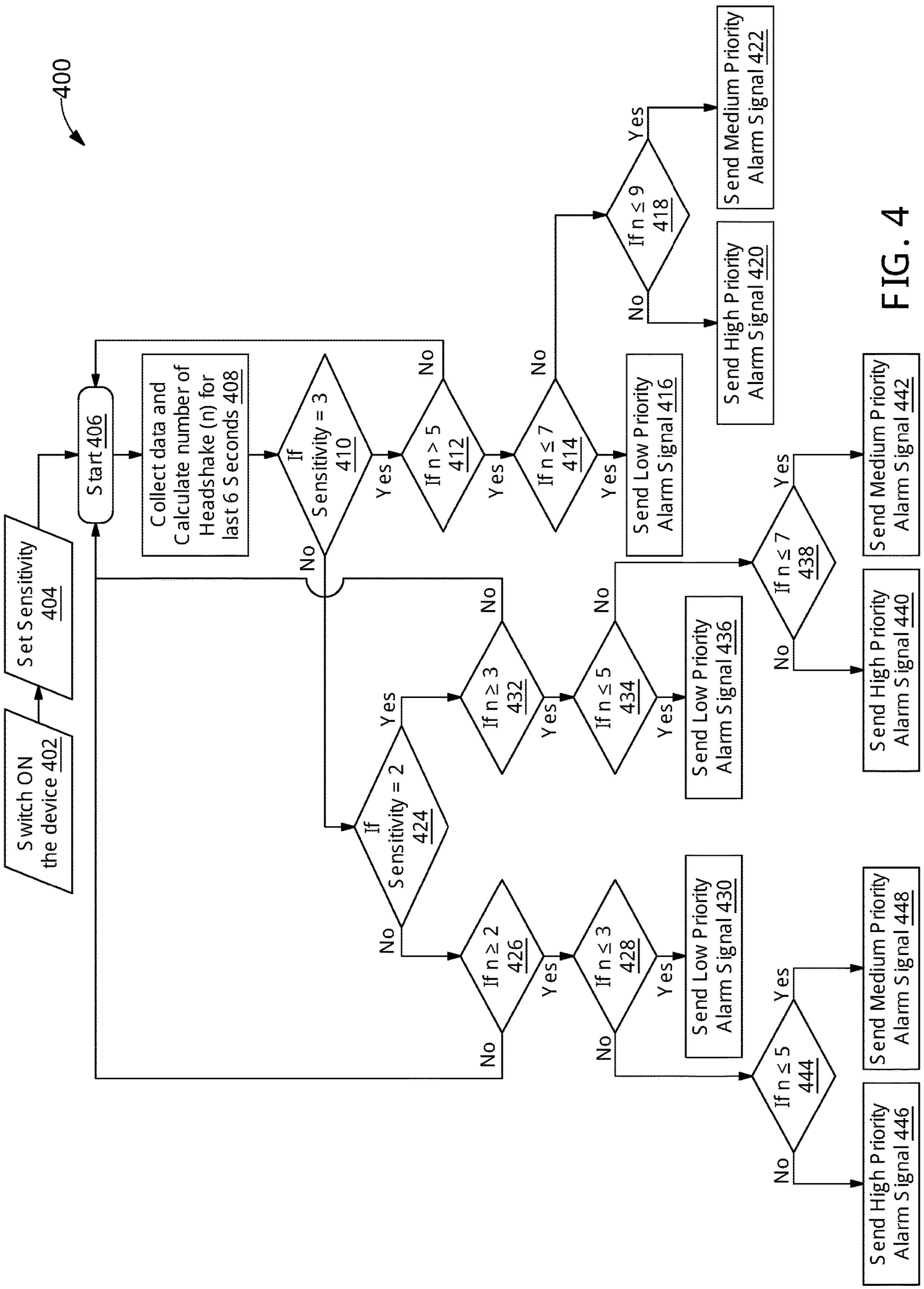
FIG. 4 illustrates a flowchart of a method of categorizing the different state of alarms based on the sensitivity level set by the user, in accordance with an embodiment of the present disclosure.

Referring to FIG. 4, is a flowchart 400 of a method of categorizing different states of alarm based on the sensitivity level set by the user is illustrated, in accordance with an embodiment. At step 402, the patient assisting device may be switched ON. At step 404, the sensitivity level may be set by the user (for example, a nursing staff). At step 406, the device may start operating. At step 408, data related to the movement of head by the patient may be collected, and number of headshakes (n) in a predetermined time frame (for example, the last six seconds) may be calculated.

At step 410, the sensitivity level may be checked. For example, if the sensitivity level is equal to 3, the method may proceed to step 412. If at step 410, the sensitivity level is not equal to 3, the method may proceed to step 424. At step 424, the sensitivity level is checked. If the sensitivity level is equal to 2, the method may proceed to step 432.

At step 432, it is checked if number of headshakes (n) is greater than or equal to 3. If not, the method once again proceeds to step 406. However, if number of headshakes (n) is greater than or equal to 3, the method may proceed to step 434 where it is checked if the number of headshakes (n) is less than or equal to 5. If so, the method proceeds to step 436, where a low priority alarm signal is sent. However, if at step 434, the number of headshakes (n) is greater than 5, the method may proceed to step 438. At step 438, it may be checked if the number of headshakes (n) is less than or equal to 7. If yes, the method may proceed to step 442 where a medium priority alarm signal may be sent. However, if at step 438, the number of headshakes (n) is greater than 7, the method may proceed to step 440 where a high priority alarm signal may be sent.

At step 424, the sensitivity level is not equal to 2, the method may proceed to step 426. At step 426, it may be checked if the number of headshakes (n) is greater than or equal to 2. If the number of headshakes (n) is not greater than or equal to 2, the method may proceed back to step 406. However, if the number of headshakes (n) is greater than or equal to 2, the method may proceed to step 428, where it is checked if the number of headshakes (n) is less than or equal to 3. If yes, the method may proceed to step 430, where a low priority alarm signal is sent.

If at step 428, it is found that the number of headshakes (n) is not less than or equal to 3, the method may proceed to step 444, where it is checked if the number of headshakes (n) is less than or equal to 5. If yes, the method may proceed to step 448, where a medium priority alarm signal is sent. However, if at step 444, the number of headshakes (n) is determined to be not less than or equal to 5, the method may proceed to step 446, where a high priority alarm signal is sent.

At step 412, the number of headshakes (n) may be checked. If number of headshakes (n) is greater than 5, then the method may proceed to step 414, where it is checked if the number of headshakes (n) is less than or equal to 7. If yes, the method may proceed to step 416, where a low priority alarm signal is sent. If at step 414, the number of headshakes (n) is determined to be not less than or equal to 7, the method may proceed to step 418, where it is checked if the number of headshakes (n) is less than or equal to 9. If yes, the method may proceed to step 422, where a medium priority alarm signal is sent. If at step 418, the number of headshakes (n) is determined to be not less than or equal to 9, the method may proceed to step 420, where a high priority alarm signal is sent.

Figure 5:
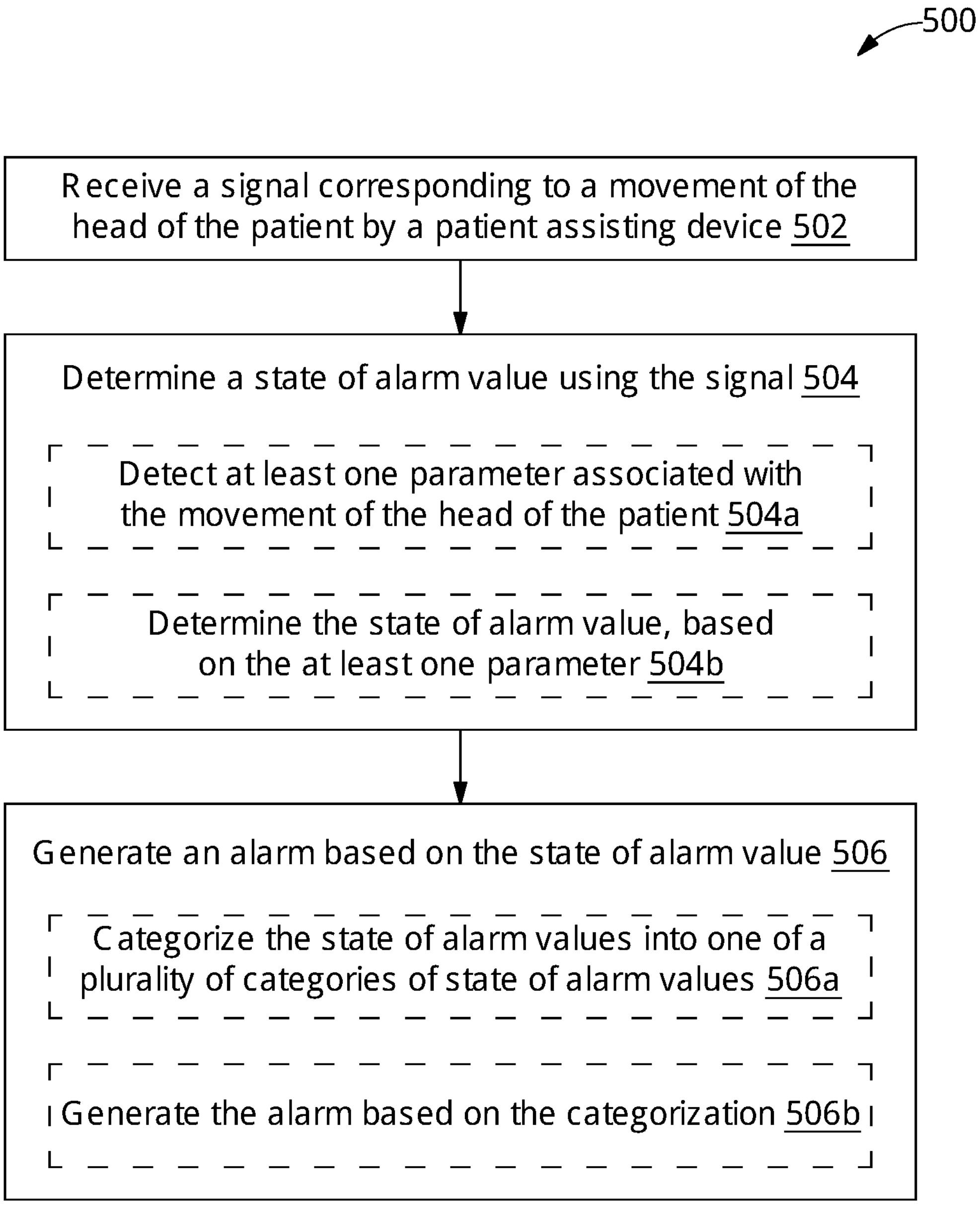
FIG. 5 illustrates a flowchart of a method for assisting a patient to raise an alarm, in accordance with an embodiment of the present disclosure.

Referring now to FIG. 5, a method 500 for assisting a patient to raise an alarm is illustrated via a flowchart, in accordance with an embodiment of the present subject matter. FIG. 5 is explained in conjunction with FIGS. 1-4.

At step 502, a signal corresponding to a movement of the head of the patient may be received. In particular, a signal corresponding to a movement of the head of the patient, may be received from a sensor, coupled with a patient assisting device. It should be noted that the sensor 106 may be configured to be positioned at a head region of the patient and may be further be configured to detect movement of the head of the patient.

At step 504, a state of alarm value may be determined using the signal. At step 504*a*, the state of the alarm value may be detected by at least one parameter associated with the movement of the head of the patient, based on a signal. It may further be noted that a at least one parameter may include a number of movements of the head of a patient, a speed of the movement of the head of a patient, and a duration of the movement by the head of a patient. As such, at step 504*b*, the state of alarm value may be determined using the signal, based on the at least one parameter associated with the movement of the head of the patient.

At step 506, an alarm based on a state of alarm value may be generated. At step 506*a*, the method 500 may include categorizing the state of alarm values into one of a plurality of categories of state of alarm values. It should be noted that the plurality of categories of state of alarm values may include a low priority state of alarm value category, a medium priority state of alarm value category or a high priority state of alarm value category. At step 506*b*, the alarm may be generated based on the categorization. In some embodiments, the method 500 may further include categorizing the state of alarm values into one of a plurality of categories, based on the sensitivity. This is further explained in conjunction with FIG. 6.

Figure 6:
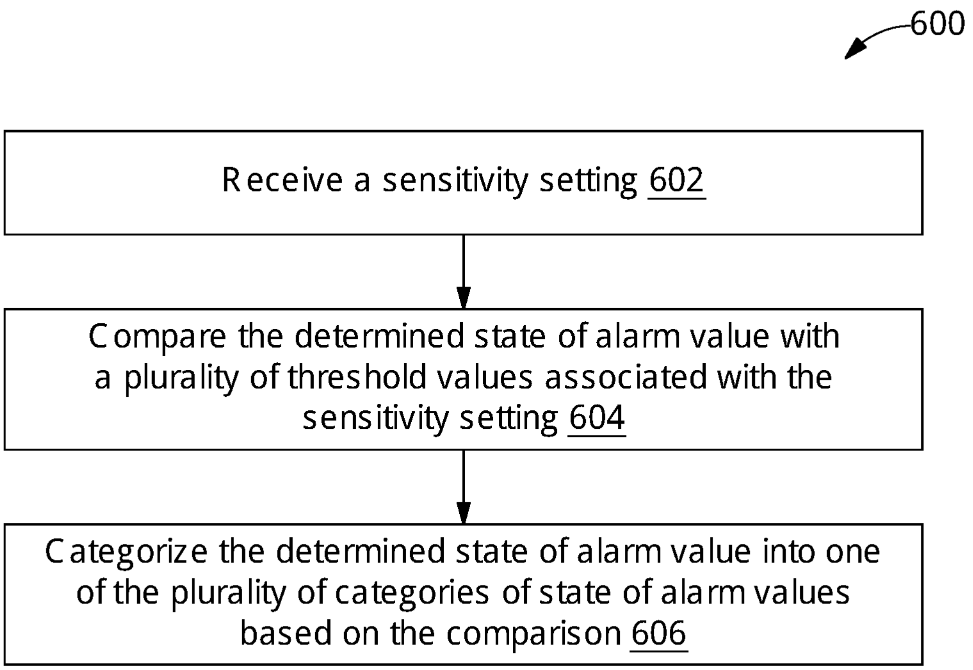
FIG. 6 illustrates a flowchart of a method of categorizing the determined state of alarm value based on the sensitivity setting, in accordance with an embodiment of the present disclosure.

Referring now to FIG. 6, a method 600 for categorization of the state of alarm values, based on a sensitivity setting is depicted via a flowchart, in accordance with an embodiment. At step 602, a sensitivity setting may be received. It should be noted that the sensitivity setting may comprise of a sensitivity level, which may further include the first sensitivity level 322, the second sensitivity level 324, and the third sensitivity level 326. In addition, the sensitivity level may further include a plurality of threshold values associated with the sensitivity setting. At step 604, the method may compare the determined state of alarm value with a plurality of threshold values associated with the sensitivity setting, wherein each of the plurality of threshold values corresponds to a category of the plurality of categories of state of alarm values. Further at step 606, the method 600 may categorize the determined state of alarm value into one of the plurality of categories of state of alarm values, based on the comparison. Further, the method 600 may cause generating of the alarm, which may be generated by the alarm generating device.

The above disclosure provides an easy solution for helping a patient to raise an alarm when the patient is not able to call out and doesn't have access to an alarm device. The patient assisting device can be easily attached to any respiratory mask available off the shelf. Further, the system provides a wireless transmission capability so that even when the patient is physically separated from the support staff, the alarm raised by the patient can be transmitted to the support staff over long distance. Further, the device consumes very little power and therefore is considered as energy efficient. The overall construction is simple and compact. Further, the device is easy, simple and economical to manufacture.

It is intended that the disclosure and examples be considered as exemplary only, with a true scope and spirit of disclosed embodiments being indicated by the following claims.

We claim:

1. A system (102) for assisting a patient to raise an alarm, the system (102) comprising:

a sensor (106) configured to be positioned at a head region of the patient, wherein the sensor (106) is configured to detect movement of head of the patient; and a patient assisting device (104) coupled to the sensor (106), the patient assisting device (104) comprising:

a processor (110); and a memory (112) communicatively coupled to the processor (110), wherein the memory (112) stores a plurality of instructions, which upon execution by the processor (110), cause the processor (110) to:

categorize state of alarm values into one of a plurality of categories of state of alarm values, wherein the categorizing comprises:

receiving a sensitivity setting;

comparing the determined state of alarm value with a plurality of threshold values associated with the sensitivity setting, wherein each of the plurality of threshold values corresponds to a category of the plurality of categories of state of alarm values; and categorizing the determined state of alarm value into one of the plurality of categories of state of alarm values based on the comparison;

receive, from the sensor (106), a signal corresponding to the movement of the head of the patient;

determine a state of alarm value from the signal; and generate an alarm based on the state of alarm value.

2. The system (102) as claimed in claim 1, wherein the sensor (106) comprises at least one of:

a three-axis accelerometer; and a gyroscope sensor.

3. The system (102) as claimed in claim 1, wherein the processor (110) is further configured to:

detect at least one parameter associated with the movement of the head of the patient, based on the signal, wherein the at least one parameter comprises:

a number of movements;

a speed of the movement; and a duration of the movement; and determine the state of alarm value, based on the at least one parameter.

4. The system (102) as claimed in claim 1, wherein the movement of the head of the patient comprises at least one of:

a head nod, wherein the head nod corresponds to a tilting of the head in alternating up and down arcs along a sagittal plane; and a head shake, wherein the head shake corresponds to a repeated turning of the head leftwards and rightwards along a transverse plane.

5. The system (102) as claimed in claim 1, wherein the plurality of categories of state of alarm values comprises:

a low priority state of alarm value category;

a medium priority state of alarm value category; or a high priority state of alarm value category; and generate the alarm based on the categorization.

6. The system (102) as claimed in claim 1, wherein the sensor (106) is attached to a respiratory mask.

7. The system (102) as claimed in claim 1, further comprising:

a transceiver (108) configured to transmit the state of alarm value to an alarm generating device (114).

8. A ventilation mask (202) comprising:

a sensor (204) configured to be positioned at a head region of a patient, wherein the sensor (204) is configured to detect movement of head of the patient; and a transceiver (206) coupled to the sensor (204), wherein the transceiver (206) is configured to transmit, to an alarm generating device (208), a signal corresponding to the movement of the head of the patient detected by the sensor (204), wherein the alarm generating device (208) is configured to:

categorize state of alarm values into one of a plurality of categories of state of alarm values, wherein the categorizing comprises:

receiving a sensitivity setting;

comparing the determined state of alarm value with a plurality of threshold values associated with the sensitivity setting, wherein each of the plurality of threshold values corresponds to a category of the plurality of categories of state of alarm values; and categorizing the determined state of alarm value into one of the plurality of categories of state of alarm values based on the comparison;

receive, from the sensor (204), the signal corresponding to the movement of the head of the patient;

determine a state of alarm value from the signal; and generate an alarm based on the state of alarm value.

9. A method for assisting a patient to raise an alarm, the method comprising:

categorizing state of alarm values into one of a plurality of categories of state of alarm values, wherein the categorizing comprises:

receiving a sensitivity setting;

comparing the determined state of alarm value with a plurality of threshold values associated with the sensitivity setting, wherein each of the plurality of threshold values corresponds to a category of the plurality of categories of state of alarm values; and categorizing the determined state of alarm value into one of the plurality of categories of state of alarm values based on the comparison;

receiving, by a patient assisting device (104), from a sensor, a signal corresponding to a movement of the head of the patient, wherein the sensor (106) is configured to be positioned at a head region of the patient, and wherein the sensor (106) is configured to detect movement of the head of the patient;

determining, by the patient assisting device (104), a state of alarm value using the signal; and generating, by the patient assisting device (104), an alarm based on the state of alarm value.

10. The method as claimed in claim 9, wherein determining the state of alarm value comprises:

detecting at least one parameter associated with the movement of the head of the patient, based on the signal, wherein the at least one parameter comprises:

a number of movements;

a speed of the movement; and a duration of the movement; and determining the state of alarm value, based on the at least one parameter.

11. The method as claimed in claim 10, wherein the plurality of categories of state of alarm values comprises:

a low priority state of alarm value category;

a medium priority state of alarm value category; or a high priority state of alarm value category; and generating the alarm based on the categorization.

* * * * *